US012026921B2

(12) United States Patent
Oquab et al.

(10) Patent No.: US 12,026,921 B2
(45) Date of Patent: Jul. 2, 2024

(54) SYSTEMS AND METHOD FOR LOW BANDWIDTH VIDEO-CHAT COMPRESSION

(71) Applicant: Meta Platforms, Inc., Menlo Park, CA (US)

(72) Inventors: Maxime Mohamad Oquab, Paris (FR); Pierre Stock, Paris (FR); Oran Gafni, Ramat Gan (IL); Daniel Raynald David Haziza, Paris (FR); Tao Xu, Sunnyvale, CA (US); Peizhao Zhang, Fremont, CA (US); Onur Çelebi, Paris (FR); Patrick Labatut, Paris (FR); Thibault Michel Max Peyronel, San Francisco, CA (US); Camille Couprie, Montgeron (FR)

(73) Assignee: Meta Platforms, Inc., Menlo Park, CA (US)

( * ) Notice: Subject to any disclaimer, the term of this patent is extended or adjusted under 35 U.S.C. 154(b) by 560 days.

(21) Appl. No.: 17/224,103

(22) Filed: Apr. 6, 2021

(65) Prior Publication Data

US 2022/0156981 A1    May 19, 2022

Related U.S. Application Data

(60) Provisional application No. 63/114,695, filed on Nov. 17, 2020.

(51) Int. Cl.
*G06T 9/00* (2006.01)
*G06F 18/213* (2023.01)
(Continued)

(52) U.S. Cl.
CPC ............ *G06T 9/001* (2013.01); *G06F 18/213* (2023.01); *G06T 7/248* (2017.01); *G06V 40/171* (2022.01); *H04N 7/147* (2013.01)

(58) Field of Classification Search
CPC ....... G06T 9/001; G06T 7/248; G06V 40/171; G06F 18/23; H04N 7/147
See application file for complete search history.

(56) References Cited

U.S. PATENT DOCUMENTS 6,044,168 A    3/2000   Tuceryan
2020/0358983 A1*  11/2020  Astarabadi ............. H04N 7/157

OTHER PUBLICATIONS

Aliaksandr Siarohin et al: "First Order Motion Model for Image Animation", arxiv.org, Cornell University Library, 201 Olin Library Cornell University Ithaca, NY 14853, Oct. 1, 2020 (Year: 2020).*
(Continued)

*Primary Examiner* — Matthew C Bella
*Assistant Examiner* — Andrew B. Jones
(74) *Attorney, Agent, or Firm* — McDermott Will & Emery LLP

(57) ABSTRACT

In one embodiment, a first device may receive, from a second device, a reference landmark map identifying locations of facial features of a user of the second device depicted in a reference image and a feature map, generated based on the reference image, representing an identity of the user. The first device may receive, from the second device, a current compressed landmark map based on a current image of the user and decompress the current compressed landmark map to generate a current landmark map. The first device may update the feature map based on a motion field generated using the reference landmark map and the current landmark map. The first device may generate scaling factors based on a normalization facial mask of pre-determined facial features of the user. The first device may generate an output image of the user by decoding the updated feature map using the scaling factors.

20 Claims, 5 Drawing Sheets

(51) Int. Cl.
    *G06T 7/246*      (2017.01)
    *G06V 40/16*      (2022.01)
    *H04N 7/14*       (2006.01)

(56) References Cited

OTHER PUBLICATIONS

S. Sinha, S. Biswas and B. Bhowmick, "Identity-Preserving Realistic Talking Face Generation," 2020 International Joint Conference on Neural Networks (IJCNN), Glasgow, UK, 2020, pp. 1-10, doi: 10.1109/IJCNN48605.2020.9206665. (Year: 2020).*
Siarohin, Aliaksandr, et al. "First order motion model for image animation." Advances in neural information processing systems 32 (2019). https://arxiv.org/abs/2003.00196 (Year: 2019).*
Oquab M., et al., "Low Bandwidth Video-Chat Compression using Deep Generative Models," Arxiv.org, Cornell University Library, Oct. 2020, 11 pages.
Siarohin A., et al., "First Order Motion Model for Image Animation," Arxiv.org, Cornell University Library, Oct. 2020, vol. 32, pp. 1-20.
Agustsson, Eirikur, Michael Tschannen, Fabian Mentzer, Radu Timofte, and Luc Van Gool. "Generative adversarial networks for extreme learned image compression." In *Proceedings of the IEEE/CVF International Conference on Computer Vision*, pp. 221-231, 2019.
Averbuch-Elor, Hadar, Daniel Cohen-Or, Johannes Kopf, and Michael F. Cohen. "Bringing portraits to life." *ACM Transactions on Graphics (TOG)* 36, No. 6 (2017): 1-13.
Bulat, Adrian, and Georgios Tzimiropoulos. "How far are we from solving the 2d & 3d face alignment problem?(and a dataset of 230,000 3d facial landmarks)." In *Proceedings of the IEEE International Conference on Computer Vision*, pp. 1021-1030. 2017.
Bulat, Adrian, and Georgios Tzimiropoulos. "Super-fan: Integrated facial landmark localization and super-resolution of real-world low resolution faces in arbitrary poses with gans." In *Proceedings of the IEEE Conference on Computer Vision and Pattern Recognition*, pp. 109-117. 2018.
Cao, Chen, Hongzhi Wu, Yanlin Weng, Tianjia Shao, and Kun Zhou. "Real-time facial animation with image-based dynamic avatars." *ACM Transactions on Graphics* 35, No. 4 (2016).
Cao, Qiong, Li Shen, Weidi Xie, Omkar M. Parkhi, and Andrew Zisserman. "Vggface2: A dataset for recognising faces across pose and age." In *2018 13th IEEE international conference on automatic face & gesture recognition (FG 2018)*, pp. 67-74. IEEE, 2018.
Chen, Lele, Guofeng Cui, Ziyi Kou, Haitian Zheng, and Chenliang Xu. "What comprises a good talking-head video generation ?: A Survey and Benchmark." *arXiv preprint arXiv:2005.03201* (2020).
Chen, Yu, Ying Tai, Xiaoming Liu, Chunhua Shen, and Jian Yang. "Fsrnet: End-to-end learning face super-resolution with facial priors." In *Proceedings of the IEEE Conference on Computer Vision and Pattern Recognition*, pp. 2492-2501. 2018.
Chung, Joon Son, Arsha Nagrani, and Andrew Zisserman. "Voxceleb2: Deep speaker recognition." *arXiv preprint arXiv: 1806.05622* (2018).
Citron, Dave. Four new Google Duo features to help you stay connected https://blog.google/products/duo/4-new-google-duo-features-help-you-stay-connected/, 2020.
Dai, Xiaoliang, Alvin Wan, Peizhao Zhang, Bichen Wu, Zijian He, Zhen Wei, Kan Chen et al. "FBNetV3: Joint architecture-recipe search using neural acquisition function." *arXiv preprint arXiv: 2006.02049* (2020).
Deng, Jiankang, Jia Guo, Niannan Xue, and Stefanos Zafeiriou, "Arcface: Additive angular margin loss for deep face recognition." In *Proceedings of the IEEE/CVF Conference on Computer Vision and Pattern Recognition*, pp. 4690-4699. 2019.
Dolhansky, Brian, Russ Howes, Ben Pflaum, Nicole Baram, and Cristian Canton Ferrer. "The deepfake detection challenge (dfdc) preview dataset." *arXiv preprint arXiv: 1910.08854*, 2019.

Gafni, Oran, Lior Wolf, and Yaniv Taigman. "Live face de-identification in video." In *Proceedings of the IEEE/CVF International Conference on Computer Vision*, pp. 9378-9387. 2019.
Jaderberg, Max, Karen Simonyan, Andrew Zisserman, and Koray Kavukcuoglu. "Spatial transformer networks." *arXiv preprint arXiv: 1506.02025* (2015).
Kim, Hyeongwoo, Pablo Garrido, Ayush Tewari, Weipeng Xu, Justus Thies, Matthias Niessner, Patrick Pérez, Christian Richardt, Michael Zollhöfer, and Christian Theobalt. "Deep video portraits." *ACM Transactions on Graphics (TOG)* 37, No. 4 (2018): 1-14.
Korshunova, Iryna, Wenzhe Shi, Joni Dambre, and Lucas Theis. "Fast face-swap using convolutional neural networks." In *Proceedings of the IEEE international conference on computer vision*, pp. 3677-3685. 2017.
Koufakis, Ioannis, and Bernard F. Buxton. "Very low bit rate face video compression using linear combination of 2D face views and principal components analysis." *Image and Vision computing* 17, No. 14 (1999): 1031-1051.
Lee, Cheng-Han, Ziwei Liu, Lingyun Wu, and Ping Luo. "Maskgan: Towards diverse and interactive facial image manipulation." In *Proceedings of the IEEE/CVF Conference on Computer Vision and Pattern Recognition*, pp. 5549-5558. 2020.
Liu, Dong, Yue Li, Jianping Lin, Houqiang Li, and Feng Wu. "Deep learning-based video coding: A review and a case study." *ACM Computing Surveys (CSUR)* 53, No. 1 (2020): 1-35.
Liu, Ziwei, Ping Luo, Xiaogang Wang, and Xiaoou Tang. "Deep learning face attributes in the wild." In *Proceedings of the IEEE international conference on computer vision*, pp. 3730-3738. 2015.
Lopez, Ricardo, and Thomas S. Huang. "Head pose computation for very low bit-rate video coding." In *International Conference on Computer Analysis of Images and Patterns*, pp. 440-447. Springer, Berlin, Heidelberg, 1995.
Nagano, Koki, Jaewoo Seo, Jun Xing, Lingyu Wei, Zimo Li, Shunsuke Saito, Aviral Agarwal, Jens Fursund, and Hao Li. "paGAN: real-time avatars using dynamic textures." *ACM Transactions on Graphics (TOG)* 37, No. 6 (2018): 1-12.
Nagrani, Arsha, Joon Son Chung, and Andrew Zisserman. "Voxceleb: a large-scale speaker identification dataset." *arXiv preprint arXiv: 1706.08612* (2017).
Nirkin, Yuval, Yosi Keller, and Tal Hassner. "Fsgan: Subject agnostic face swapping and reenactment." In *Proceedings of the IEEE/CVF International Conference on Computer Vision*, pp. 7184-7193. 2019.
Rippel, Oren, Sanjay Nair, Carissa Lew, Steve Branson, Alexander G. Anderson, and Lubomir Bourdev. "Learned video compression." In *Proceedings of the IEEE/CVF International Conference on Computer Vision*, pp. 3454-3463. 2019.
Park, Taesung, Ming-Yu Liu, Ting-Chun Wang, and Jun-Yan Zhu. "Semantic image synthesis with spatially-adaptive normalization." In *Proceedings of the IEEE/CVF Conference on Computer Vision and Pattern Recognition*, pp. 2337-2346. 2019.
Sandler, Mark, Andrew Howard, Menglong Zhu, Andrey Zhmoginov, and Liang-Chieh Chen. "Mobilenetv2: Inverted residuals and linear bottlenecks." In *Proceedings of the IEEE conference on computer vision and pattern recognition*, pp. 4510-4520. 2018.
Santurkar, Shibani, David Budden, and Nir Shavit. "Generative compression." In *2018 Picture Coding Symposium (PCS)*, pp. 258-262. IEEE, 2018.
Siarohin, Aliaksandr, Stéphane Lathuilière, Sergey Tulyakov, Elisa Ricci, and Nicu Sebe. "First order motion model for image animation." *Advances in Neural Information Processing Systems* 32 (2019): 7137-7147.
Söderström, Ulrik. "Very low bitrate facial video coding: based on principal component analysis." PhD diss., Tillämpad fysik och elektronik, 2006.
Son, Le-Hung, Ulrik Söderström, and Haibo Li. "Ultra low bit-rate video communication: video coding= pattern recognition." (2006).
Prado, Luis Torres Daniel. "A Proposal for High Compression of Faces in Video Sequences using Adaptive Eigenspaces." In *IEEE International Conference on Image Processing*, Rochester, USA.
Ustinova, Evgeniya, and Victor Lempitsky. "Deep multi-frame face super-resolution." *arXiv preprint arXiv: 1709.03196* (2017).

(56) References Cited

OTHER PUBLICATIONS

Wan, Alvin, Xiaoliang Dai, Peizhao Zhang, Zijian He, Yuandong Tian, Saining Xie, Bichen Wu et al. "Fbnetv2: Differentiable neural architecture search for spatial and channel dimensions." In *Proceedings of the IEEE/CVF Conference on Computer Vision and Pattern Recognition*, pp. 12965-12974.

Wiles, Olivia, A. Koepke, and Andrew Zisserman. "X2face: A network for controlling face generation using images, audio, and pose codes." In Proceedings of the European conference on computer vision (ECCV), pp. 670-686.

Wu, Bichen, Xiaoliang Dai, Peizhao Zhang, Yanghan Wang, Fei Sun, Yiming Wu, Yuandong Tian, Peter Vajda, Yangqing Jia, and Kurt Keutzer. "Fbnet: Hardware-aware efficient convnet design via differentiable neural architecture search." In *Proceedings of the IEEE/CVF Conference on Computer Vision and Pattern Recognition*, pp. 10734-10742, 2019.

Yu, Changqian, Jingbo Wang, Chao Peng, Changxin Gao, Gang Yu, and Nong Sang. "Bisenet: Bilateral segmentation network for real-time semantic segmentation." In *Proceedings of the European conference on computer vision (ECCV)*, pp. 325-341, 2018.

Zakharov, Egor, Aleksei Ivakhnenko, Aliaksandra Shysheya, and Victor Lempitsky. "Fast Bi-layer Neural Synthesis of One-Shot Realistic Head Avatars." In *European Conference on Computer Vision*, pp. 524-540. Springer, Cham, 2020.

Zakharov, Egor, Aliaksandra Shysheya, Egor Burkov, and Victor Lempitsky. "Few-shot adversarial learning of realistic neural talking head models." In *Proceedings of the IEEE/CVF International Conference on Computer Vision*, pp. 9459-9468, 2019.

Zhang, Richard, Phillip Isola, Alexei A. Efros, Eli Shechtman, and Oliver Wang. "The unreasonable effectiveness of deep features as a perceptual metric." In *Proceedings of the IEEE conference on computer vision and pattern recognition*, pp. 586-595, 2018.

\* cited by examiner

SYSTEMS AND METHOD FOR LOW BANDWIDTH VIDEO-CHAT COMPRESSION

PRIORITY

This application claims the benefit, under 35 U.S.C. § 119(e), of U.S. Provisional Patent Application No. 63/114,695, filed 17 Nov. 2020, which is incorporated herein by reference.

TECHNICAL FIELD

This disclosure generally relates to controls and interfaces for user interactions and experiences in a video call environment.

BACKGROUND

Video-chat communication between two or more devices requires technologies for reception and transmission of audio-video signals by users in different locations for communication between the participants in real time. For instance, a smartphone may be capable and be used to for simultaneous video and audio communication between people in real time. As telecommunication infrastructure has improved in prior years, telecommunication services enabled people to easily perform video-chat communication between two people. However, not all telecommunication infrastructure has improved to a state that allows people to perform video-chat communication and/or the telecommunication services may be cost prohibitive to some people to restrict people from being able to perform video-chat communication.

SUMMARY OF PARTICULAR EMBODIMENTS

Disclosed herein is a way to achieve low-bandwidth video-chat compression between two devices. Currently, video-calling may be unavailable or unaffordable for many users around the world. This may be the result of the prohibitive cost of data plans or because the users depend on outdated technologies and infrastructures. For example, the users' networks may suffer from congestions, poor coverage, power fluctuations, and data rate limits. As another example, 2G networks that are currently used may allow for a maximum of 30 kbits/s, whereas for current technologies an acceptable video-call quality requires at least a stable 200 kbits/s connection. As such, one goal of the disclosed methods is to enable users who previously were unable to utilize video-chat capabilities of smartphones by reducing the bandwidth of a video-chat is needed while maintaining the video-chat quality.

In particular embodiments, to reduce the bandwidth of a video-chat, the video captured at a participant's device may be compressed in a unique way. That is, the sender's device may use an encoder to generate an embedding or feature map that is representative of the sender's identity and a reference landmark map (e.g., a map indicating the position of key facial features, such as eyes, mouth, etc.) from a reference frame comprising a reference image. After the initial generation of the feature map and reference landmark map from the reference frame, the sender's device may take a current frame and generate a landmark map (e.g., a map indicating the position of key facial features, such as eyes, mouth, etc.) based on the current frame. The sender's device may send a landmark map for each current frame instead of the image and pixel information. Thereby, heavily reducing the bandwidth of a video-chat. The sender's device may additionally compress one or more of the reference landmark map or the landmark map prior to sending to a receiving device. The receiver's device may receive the feature map, reference landmark map, and subsequent landmark maps. The reference landmark map and/or subsequent landmark maps may be compressed. The receiver's device may decompress the compressed reference landmark map and/or subsequent compressed landmark maps that it receives from the sender's device. The reference landmark map may be used to compare to a received current landmark map. The receiver's device may generate a motion field based on the comparison of the reference landmark map to the received current landmark map. The motion field may specify which pixel in the feature map space should be moved (e.g., if the feature map has x,y,z dimensions, the z-dimension vector would be moved around according to the motion field). Additionally, the receiver's device may generate a normalization mask based on the received current landmark map, which is fed into a machine-learning model to generate for each 3D tensor layer, a corresponding 3D tensor of scaling factors and corresponding 3D tensor of offset factors of the same dimension. The receiver's device may apply the scaling and offset tensors element-wise to the 3D tensor of the feature map in that layer. The application of the scaling and offset tensors may be done for each layer during a decoding process by the receiver's device. After the decoding process, the receiver's device may present the decoded image to the receiver.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
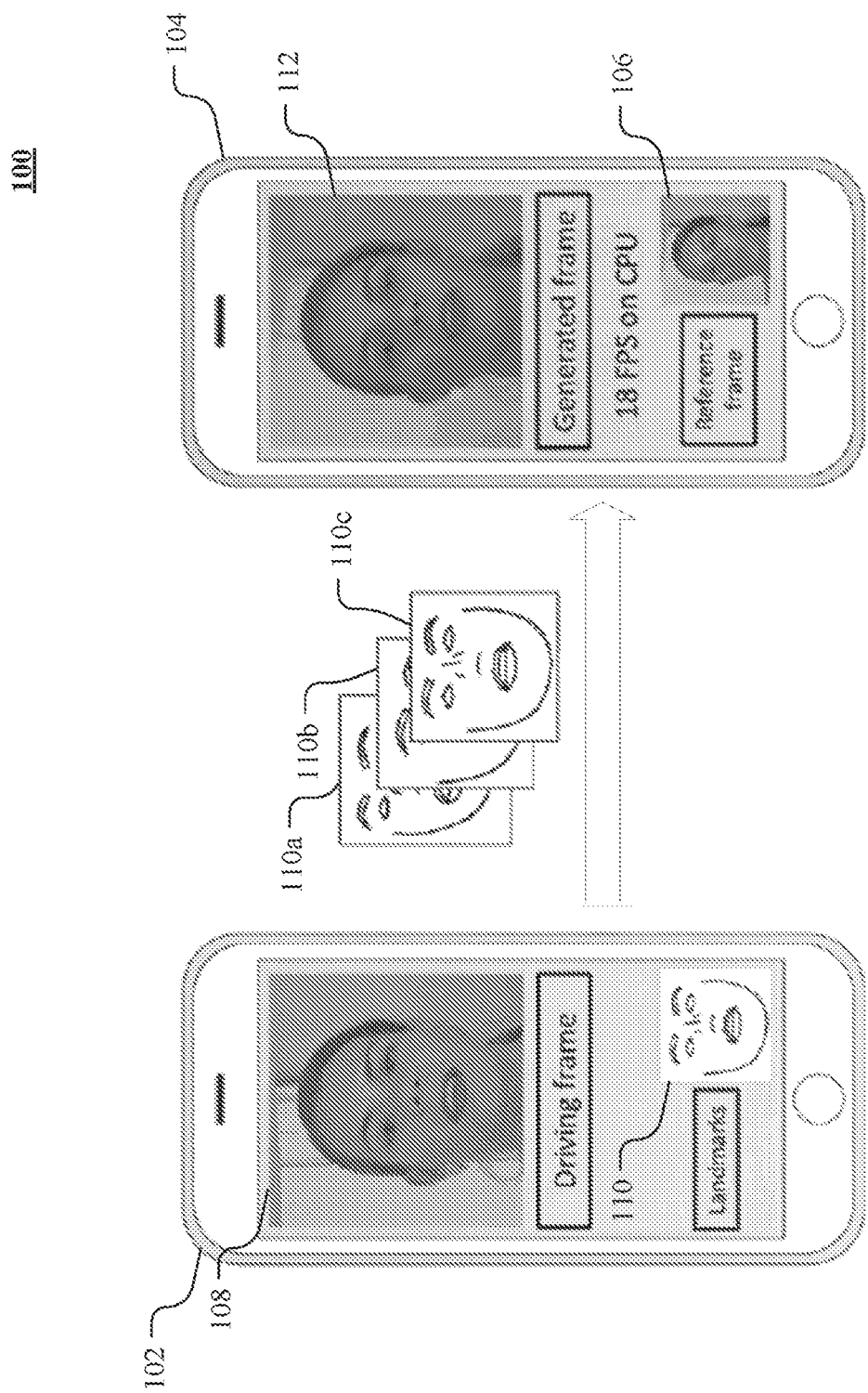
FIG. 1 illustrates an example environment of a communication between two video-chat participant devices.

Currently, video-calling may be unavailable or unaffordable for many users around the world. This may be the result of the prohibitive cost of data plans or because the users depend on outdated technologies and infrastructures. For example, the users' networks may suffer from congestions, poor coverage, power fluctuations, and data rate limits. As another example, 2G networks that are currently used may allow for a maximum of 30 kbits/s, whereas for current technologies an acceptable video-call quality requires at least a stable 200 kbits/s connection. As such, to enable users who previously were unable to utilize video-chat capabilities of smartphones, a way to reduce the bandwidth of a video-chat is needed while maintaining the video-chat quality.

In particular embodiments, to reduce the bandwidth of a video-chat, the video captured at a participant's device may be compressed in a unique way. That is, the sender's device may use an encoder to generate an embedding or feature map that is representative of the sender's identity and a reference landmark map (e.g., a map indicating the position of key facial features, such as eyes, mouth, etc.) from a reference frame. After the initial generation of the feature map and reference landmark map from the reference frame, the sender's device may take a current frame and generate a landmark map (e.g., a map indicating the position of key facial features, such as eyes, mouth, etc.) based on the current frame. The sender's device may send a landmark map for each current frame instead of the image and pixel information. Thereby, heavily reducing the bandwidth of a video-chat. The sender's device may additionally compress one or more of the reference landmark map or the landmark map prior to sending to a receiving device. The receiver's device may receive the feature map, reference landmark maps, and subsequent landmark maps. The reference landmark map and/or subsequent landmark maps may be compressed. The receiver's device may decompress the compressed reference landmark map and/or subsequent compressed landmark maps that it receives from the sender's device. The reference landmark map may be used to compare to a received current landmark map. The receiver's device may generate a motion field based on the comparison of the reference landmark map to the received current landmark map. The motion field may specify which pixel in the feature map space should be moved (e.g., if the feature map has x,y,z dimensions, the z-dimension vector would be moved around according to the motion field). Additionally, the receiver's device may generate a normalization mask based on the received current landmark map, which is fed into a machine-learning model to generate for each 3D tensor layer, a corresponding 3D tensor of scaling factors and corresponding 3D tensor of offset factors of the same dimension. The receiver's device may apply the scaling and offset tensors element-wise to the 3D tensor of the feature map in that layer. The application of the scaling and offset tensors may be done for each layer during a decoding process by the receiver's device. After the decoding process, the receiver's device may present the decoded image to the receiver.

In particular embodiments, a first device or recipient device may receive an initial video-chat package from a second device or sender device. In particular embodiments, a sender device and a recipient device may either or both be embodied as a smartphone, a laptop, or another computing system that is configured to perform the functions described herein. The sender device and the recipient device may both comprise one or more cameras to capture a plurality of images of the user of the respective devices. When a video-chat communication is initiated between two devices, a sender device (e.g., a second device) may initially send a video-chat package that includes one or more of a reference landmark map, a reference image, or a feature map. In particular embodiments, the reference landmark map may identify one or more locations of facial features of a user of the sender device depicted in a reference image. As an example and not by way of limitation, a landmark may correspond to a location of one or more of an eye of a user, a nose of a user, a mouth of a user, and the like. In particular embodiments, the reference landmark map may indicate a plurality of reference locations of N landmarks for the reference image of the user. In particular embodiments, the feature map may be generated based on the reference image, and the feature map may represent an identity of the user. In particular embodiments, the sender device may generate the reference landmark map and the feature map to send to the recipient device. In particular embodiments, the sender device may encode one or more of the reference landmark map, the reference image, or the feature map to send to the recipient device, which would then decode the received items. In particular embodiments, the sender device may compress one or more of the reference landmark map, the reference image, or the feature map to send to the recipient device, which would then decompress the received items. In particular embodiments, the sender device may use a machine-learning model to encode one or more items as described herein. The machine-learning model may include one or more residual blocks and one or more downsampling blocks to process one or more items to send to a recipient device. As an example and not by way of limitation, the machine-learning model may include five residual blocks and three downsampling blocks to process one or more items to send to a recipient device. Although this disclosure describes the video-chat communication using a sender device and a recipient device, each of these devices may simultaneously be a sender device and a recipient device in the video-chat communication. As an example and not by way of limitation, each device participating in a video-chat communication may be a recipient device and a sender device. While a first device is used to refer to the recipient device and the second device is used to refer to a sender device, the first device may be used to refer to the sender device and the second device may be used to refer to the recipient device. Although this disclosure describes receiving an initial video-chat package in a particular manner, this disclosure contemplates receiving an initial video-chat package in any suitable manner.

In particular embodiments, the first device or recipient device may receive a current frame in a sequence of frames. In particular embodiments, the current frame may comprise a current landmark map that is generated based on a current image of the user. In particular embodiments, a sender device may generate a current landmark map based on a current image of the user. The sender device may send the generated current landmark map to the recipient device instead of the current image. In particular embodiments, the sender device may compress the generated current landmark map prior to sending to the recipient device. By sending the generated current landmark map instead of an image, the sender device may reduce the bandwidth required by a video-chat communication between the sender device and the recipient device. In particular embodiments, the sender device may encode the generated current landmark map prior to sending to the recipient device. In particular embodiments, the recipient device may receive a subsequent frame in a sequence of frames comprising a subsequent landmark map generated based on a subsequent image of the user. As the sender device continues to capture a video of the user (e.g., user of the sender device) with a camera located on the sender device, where the video comprises a sequence of frames containing images of the user, the sender device may continually generate a subsequent landmark map based on the image of the user in the current frame. In particular embodiments, the current landmark map may indicate a plurality of current locations of N landmarks for the current image of the user. Although this disclosure describes receiving a current frame in a sequence of frames in a particular manner, this disclosure contemplates receiving a current frame in a sequence of frames in any suitable manner.

In particular embodiments, the first device or recipient device may update a feature map. In particular embodiments, the recipient device may update a feature map based on a motion field. In particular embodiments, the motion field may indicate a change in location from reference locations of N landmarks to current locations of N landmarks. As an example and not by way of limitation, if the user's nose was located in a first location identified by a reference location X, and the user's nose was located in a second location identified by a current location Y, then the motion field would indicate the change from the first location X and the second location Y. The motion field may be generated using the reference landmark map and the current landmark map. In particular embodiments, the motion field may be generated by applying a dense motion machine-learning model to a downsampled reference image, a reference landmark map, and a current landmark map. In particular embodiments, the dense motion machine-learning model may generate a motion field and an occlusion map using the downsampled reference image, the reference landmark map, and the current landmark map. In particular embodiments, the motion field may be continually generated based on a current landmark map as a new landmark map is received by the recipient device. In particular embodiments, the feature map may be updated based on the occlusion map. The feature map may first be updated using the motion field and then updated using the occlusion map. In particular embodiments, the feature map may be multiplied element-wise with the occlusion map to update the feature map. In particular embodiments, the occlusion map may indicate one or more portions of a face of a user that is occluded in a current frame. As an example and not by way of limitation, the occlusion map may indicate that a person's ear is occluded in the current frame because of the user rotating their face. Although this disclosure describes updating a feature map in a particular manner, this disclosure contemplates updating a feature map in any suitable manner.

In particular embodiments, the first device or recipient device may generate scaling factors. The recipient device may generate the scaling factors based on a normalization facial mask of pre-determined facial features of the user. In particular embodiments, the pre-determined facial features may vary from 10, 20, 30, etc. The number of pre-determined facial features may be selected based on the available bandwidth for video-chat communication. In particular embodiments, the normalization facial mask is generated based on a set of landmarks. The set of landmarks may include the landmarks from the reference landmark map and the current landmark map. In particular embodiments, the recipient device may use a machine-learning model to generate the scaling factors. Although this disclosure describes generating scaling factors in a particular manner, this disclosure contemplates generating scaling factors in any suitable manner.

In particular embodiments, the first device or recipient device may generate an output image. In particular embodiments, the recipient device may decode the feature map using the scaling factors to generate the output image. After the feature map is updated using the motion filed and/or the occlusion map, the recipient device may decode the feature map using scaling factors generated based on the normalization facial mask. As an example and not by way of limitation, a SPADE normalization mask may be used to generate the scaling factors. In particular embodiments, the recipient device may continually generate an output image after decoding updated feature maps (e.g., feature maps updated based on motion field and/or occlusion map for a current frame). The generation of output images may be used generate a video of the user of the sender device to present to the recipient device thereby enabling a video-chat communication between two users. While this disclosure describes generating output images on a recipient device, the recipient device may also be sending the similar items as the sender device so the sender device may generate output images of the user of the recipient device. In particular embodiments, the scaling factors may include several sets of scaling factors to be applied to the feature map. In particular embodiments, the recipient device may apply a first set of scaling factors to an updated feature map to generate a first layer of the output image. The recipient device may apply a second set of scaling factors to the first layer of the output image to generate a second layer of the output image. The recipient device may apply a subsequent set of scaling factors to the second layer of the output image to generate the output image. The recipient device may apply any number of sets of scaling factors to layers of the output image to generate the output image. In particular embodiments, the recipient device may use a machine-learning model to decode an updated feature map (e.g., feature map updated using a motion field and an occlusion map). In particular embodiments, the machine-learning model may comprise one or more residual blocks and one or more upsampling blocks that apply a normalization facial mask (e.g., SPADE normalization mask). As an example and not by way of limitation, the machine-learning model may include five residual blocks and three upsampling blocks to process an updated feature map. Although this disclosure describes generating an output image in a particular manner, this disclosure contemplates generating an output image in any suitable manner.

FIG. 1 illustrates an example environment 100 of a communication between two video-chat participant devices 102, 104. In particular embodiments, the environment 100 may include a sender device 102 and a recipient device 104. While a certain number of devices 102, 104 is shown, the environment 100 may include any number of devices. As an example and not by way of limitation, the environment may include three devices that are performing a group video-chat communication, where a sender device 102 would perform functions with respect to two recipient devices. In particular embodiments, the sender device 102 and recipient device 104 may be embodied as a smartphone. The sender device 102 and the recipient device 104 may include one or more cameras to capture the user of the respective devices. In particular embodiments, either participant devices 102, 104 may initiate the video-chat communication. As an example and not by way of limitation, the user of the sender device 102 may select to initiate a video-chat communication with the user of the recipient device 104. For instance, the user may select a videocall option with the user of the recipient device 104 in a social-networking application. In particular embodiments, after the user of the recipient device 104 accepts the video-chat request from the sender device 102, the sender device may send an initial video-chat package to the recipient device 104. In particular embodiments, the initial video-chat package may include one or more of a reference frame 106 including a reference image, a reference landmark map, or a feature map. While only one reference frame 106 may be sent, the sender device 102 may send multiple reference frames 106 containing reference images of the user of the sender device 102. As an example and not by way of limitation, the sender device 102 may periodically send an updated reference frame 106 after a predetermined time period has elapsed. In particular embodiments, the sender device 102 may determine the user is in a different pose from an initial reference frame 106 and send an updated reference frame 106 in response to the determination. In particular embodiments, the sender device 102 may encode one or more items to send to the recipient device 104. As an example and not by way of limitation, the sender device 102 may encode a reference image to send to the recipient device 104. In particular embodiments, the sender device 102 may use a machine-learning model to encode one or more items to send to the recipient device 104 as described herein. In particular embodiments, the sender device 102 may capture a driving frame 108, which may contain a current image of the user of the sender device 102. In particular embodiments, the sender device 102 may generate a current landmark map 110 based on the current image of the driving frame 108. In particular embodiments, the sender device 102 may encode the current landmark map 110 to send to the recipient device 104. In particular embodiments, the recipient device 104 may decode the encoded items and generate an output image 112 to present to the user of the recipient device 104 as described herein. In particular embodiments, the sender device 102 may continually send current landmark maps 110a-110c as the sender device 102 captures a current image of the user and generates a corresponding landmark map 110 of the current image. As the recipient device 104 continually decodes the encoded items and generates an output image 112, the recipient device 104 may present a video of the user of the sender device 102 to the user of the recipient device 104. As an example and not by way of limitation, the recipient device 104 may present a series of output images 112 of the user of the sender device 102 through a display of the recipient device 104. In particular embodiments, the output image 112 may be updated at a particular frame rate. As an example and not by way of limitation, the output image 112 may be updated at a frame rate of 18 frames per second. While the environment 100 discusses a sender device 102 performing certain functions and a recipient device 104 performing certain functions, the environment 100 contemplates the sender device 102 simultaneously performing the functions of the recipient device 104 and the recipient device 104 simultaneously performing the functions of the sender device 102.

Figure 2:
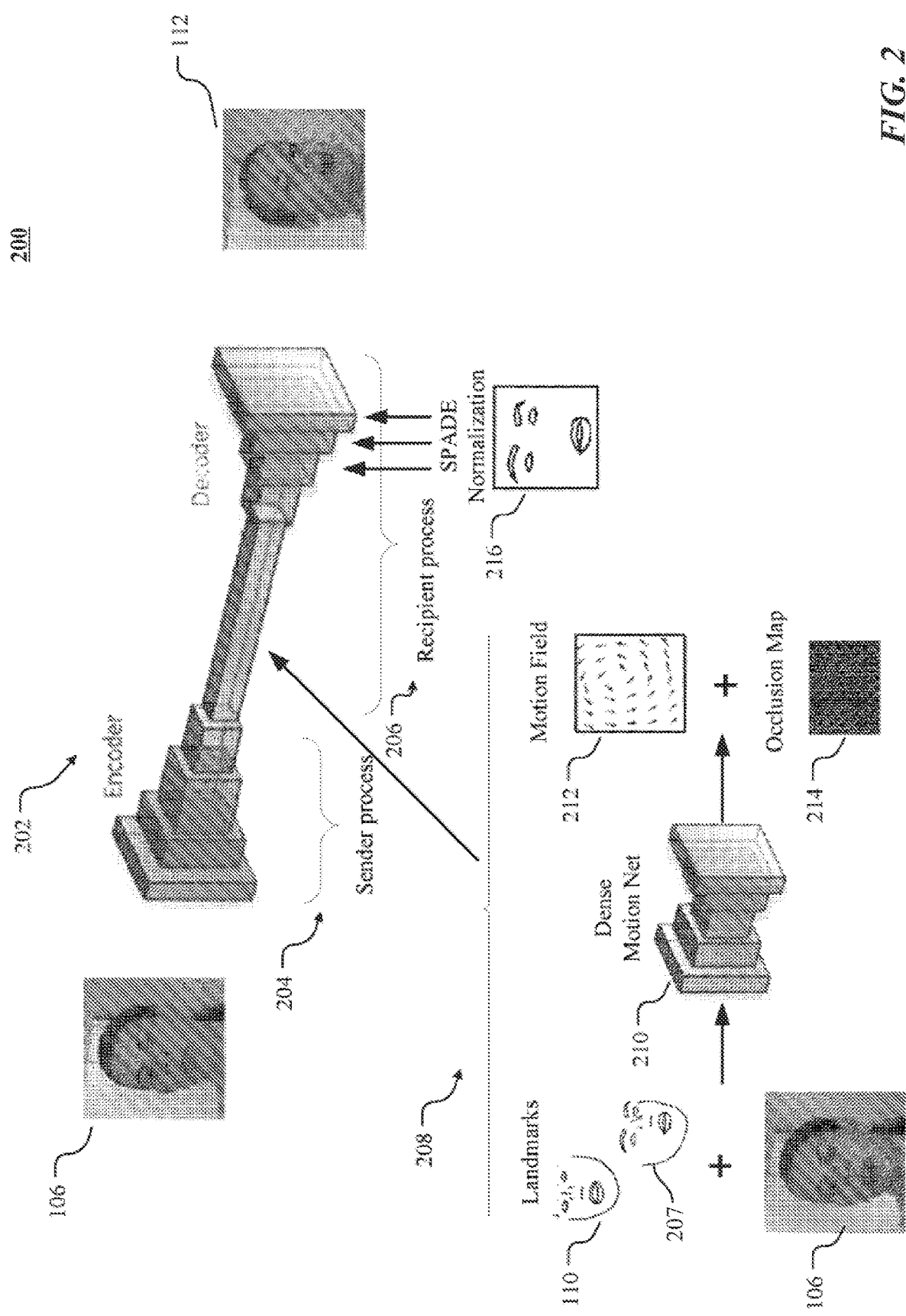
FIG. 2 illustrates an example process of generating an output image.

FIG. 2 illustrates an example process 200 of generating an output image 112. In particular embodiments, the process 200 may use a machine-learning model 202 to generate the output image 112. In particular embodiments, the process 200 may be performed by the sender device 102 and the recipient device 104. The machine-learning model 202 may comprise a sender process 204 that is performed by a sender device 102 and a recipient process 206 that is performed by a recipient device 104. In particular embodiments, a sender device 102 may send an initial reference frame 106 containing a reference image to a recipient device 104. In particular embodiments, the sender process 204 may include a sender device 102 encoding one or more items to send to a recipient device 104. As an example and not by way of limitation, the sender device 102 may encode a feature map to send to the recipient device 104. As another example and not by way of limitation, the sender device 102 may encode a reference image to send to the recipient device 104. As another example and not by way of limitation, the sender device 102 may encode a reference landmark map 207 to send to the recipient device 104. As another example and not by way of limitation, the sender device 102 may encode a current landmark map 110 to send to the recipient device 104. In particular embodiments, the recipient process 206 may include a motion field machine-learning process 208 and normalization process 216. The motion field machine-learning process 208 may receive a current landmark map 110 and a reference image 106 to apply a dense motion net 210 to generate a motion field 212 and an occlusion map 214. In particular embodiments, the reference image 106 used in the motion field machine-learning may be a reference landmark map 207 corresponding to the reference image 106. In particular embodiments, the dense motion net 210 may be a machine-learning model used to generate the motion field 212 and the occlusion map 214. In particular embodiments, the motion field 212 may indicate a change in location from reference locations of N landmarks to current locations of N landmarks. As an example and not by way of limitation, the motion field 212 may indicate a change in location from a reference landmark generated from the reference image 106 to the location of a current landmark 110. For instance, the change in location of the nose landmark from the reference landmark map and a current landmark map 110. In particular embodiments, the occlusion map 214 may indicate one or more portions of a face of the user of the sender device 102 that is occluded in a current frame compared to the reference frame. The recipient process 206 continues with updating, using the recipient device 104, an encoded feature map received from the sender process 204 and the sender device 102. In particular embodiments, the recipient device 104 may update the encoded feature map using the motion field 212 and the occlusion map 214 as described herein. In particular embodiments, the recipient device 104 may warp the encoded feature map using the motion field 212. In particular embodiments, the recipient device 104 may multiply the result of the warped feature map element-wise with the occlusion map 214. As an example and not by way of limitation, this may result in moving two landmarks in a reference landmark map from a first location to a second location because the warped effect from the motion field 212. Continuing the example, one of the two landmarks may be removed because of the application of the occlusion map 214. In particular embodiments, the recipient process 206 may continue with upscaling the result of the warped feature map multiplied by the occlusion map 214 using a normalization facial mask, such as a SPADE normalization 216. In particular embodiments, the SPADE normalization 216 may use semantic maps which come from drawn polygons of facial features (e.g., eyes, eyebrows, lips, inner mouth) using extracted facial landmarks. In particular embodiments, the SPADE normalization 216 may be generated based on a set of landmarks, which may include the landmarks from a current landmark map 110 and other compressed landmarks (e.g., from a reference image 106 and/or reference landmark map). In particular embodiments, the SPADE normalization 216 may be a machine-learning model to generate scaling factors to apply to the result of the warped feature map multiplied by the occlusion map 214. In particular embodiments, the scaling factors may be applied to the warped feature map to generate an output image 112. In particular embodiments, the SPADE normalization 216 may generate sets of scaling factors to apply to different layers of decoder. As an example and not by way of limitation, a first set of scaling factors may be applied to the result of the warped feature map multiplied by the occlusion map 214 to generate a first layer of an output image 112. A second set of scaling factors may be applied to the first layer of the output image 112 to generate a second layer of the output image 112. This process of SPADE normalization 216 may proceed until an output image 112 is generated. As an example and not by way of limitation, the SPADE normalization 216 may generate five sets of scaling factors to apply to the layers of the original warped feature map. In particular embodiments, the output image 112 may be presented on a display of the recipient device 104. While the process 200 is described as some functions being performed the sender device 102 and some functions being performed by the recipient device 104, the process 200 contemplates the sender device 102 performing the same functions as the recipient device 104 and the recipient device 104 performing the same functions as the sender device 102. As an example and not by way of limitation, as the sender device 102 is sending a current landmark map 110 for the recipient device 104 to generate an output image 112 of the user of the sender device 102, the sender device 102 may receive a current landmark map 110 from the recipient device 104 to generate an output image 112 of the user of the recipient device 104.

Figure 3:
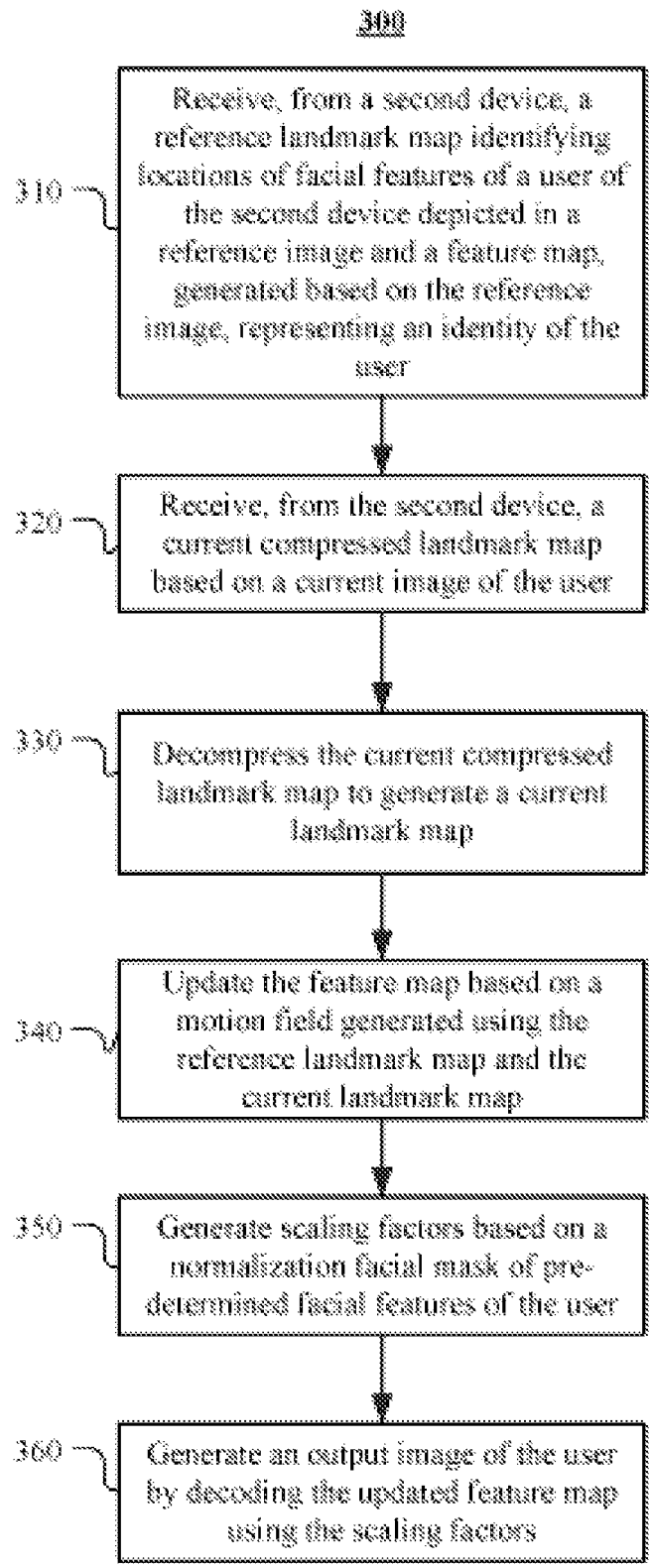
FIG. 3 illustrates an example method for generating an output image.

FIG. 3 illustrates an example method 300 for generating an output image. The method 300 may begin at step 310, where a first device may receive, from a second device, a reference landmark map identifying locations of facial features of a user of the second device depicted in a reference image and a feature map, generated based on the reference image, representing an identity of the user. At step 320, the first device may receive, from the second device, a current compressed landmark map based on a current image of the user. At step 330, the first device may decompress the current compressed landmark map to generate a current landmark map. At step 340, the first device may update the feature map based on a motion field generated using the reference landmark map and the current landmark map. At step 350, the first device may generate scaling factors based on a normalization facial mask of pre-determined facial features of the user. At step 360, the first device may generate an output image of the user by decoding the updated feature map using the scaling factors. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating an output image, including the particular steps of the method of FIG. 3, this disclosure contemplates any suitable method of generating an output image, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
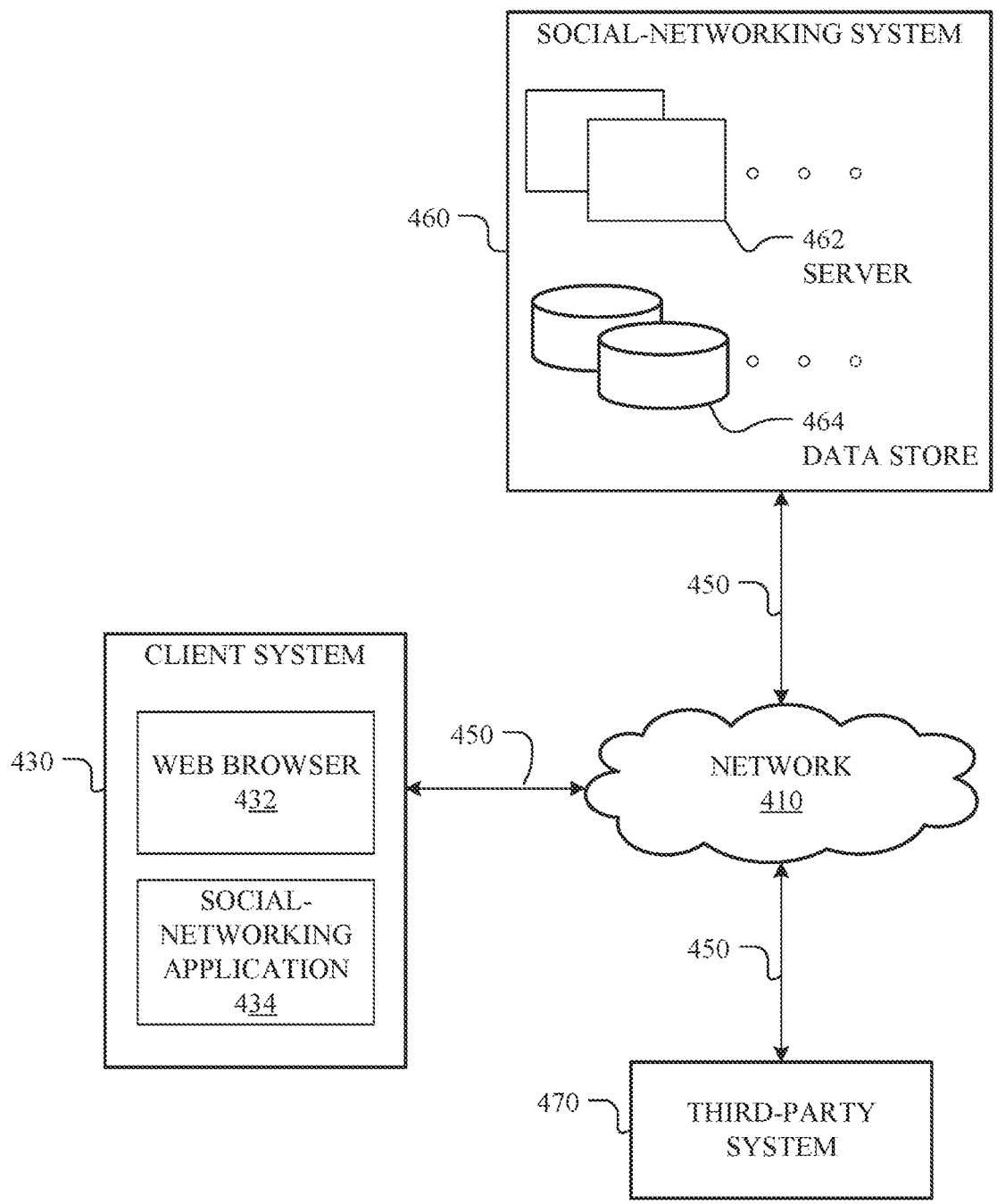
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of a client system 430, a social-networking system 460, a third-party system 470, and a network 410, this disclosure contemplates any suitable arrangement of a client system 430, a social-networking system 460, a third-party system 470, and a network 410. As an example and not by way of limitation, two or more of a client system 430, a social-networking system 460, and a third-party system 470 may be connected to each other directly, bypassing a network 410. As another example, two or more of a client system 430, a social-networking system 460, and a third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client systems 430, social-networking systems 460, third-party systems 470, and networks 410.

This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect a client system 430, a social-networking system 460, and a third-party system 470 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

In particular embodiments, a client system 430 may be an electronic device including hardware, software, or embedded logic components or a combination of two or more such components and capable of carrying out the appropriate functionalities implemented or supported by a client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 430. A client system 430 may enable a network user at a client system 430 to access a network 410. A client system 430 may enable its user to communicate with other users at other client systems 430. A client system 430 may generate a virtual reality environment for a user to interact with content.

In particular embodiments, a client system 430 may include a web browser 432, and may have one or more add-ons, plug-ins, or other extensions. A user at a client system 430 may enter a Uniform Resource Locator (URL) or other address directing a web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to a client system 430 one or more Hyper Text Markup Language (HTML) files responsive to the HTTP request. The client system 430 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 430 may include a social-networking application 434 installed on the client system 430. A user at a client system 430 may use the social-networking application 434 to access on online social network. The user at the client system 430 may use the social-networking application 434 to communicate with the user's social connections (e.g., friends, followers, followed accounts, contacts, etc.). The user at the client system 430 may also use the social-networking application 434 to interact with a plurality of content objects (e.g., posts, news articles, ephemeral content, etc.) on the online social network. As an example and not by way of limitation, the user may browse trending topics and breaking news using the social-networking application 434.

In particular embodiments, the social-networking system 460 may be a network-addressable computing system that can host an online social network. The social-networking system 460 may generate, store, receive, and send social-networking data, such as, for example, user-profile data, concept-profile data, social-graph information, or other suitable data related to the online social network. The social-networking system 460 may be accessed by the other components of network environment 400 either directly or via a network 410. As an example and not by way of limitation, a client system 430 may access the social-networking system 460 using a web browser of a third-party content 440, or a native application associated with the social-networking system 460 (e.g., a mobile social-networking application, a messaging application, another suitable application, or any combination thereof) either directly or via a network 410. In particular embodiments, the social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, the social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, the social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. The social-networking system 460 may provide users of the online social network the ability to communicate and interact with other users. In particular embodiments, users may join the online social network via the social-networking system 460 and then add connections (e.g., relationships) to a number of other users of the social-networking system 460 whom they want to be connected to. Herein, the term "friend" may refer to any other user of the social-networking system 460 with whom a user has formed a connection, association, or relationship via the social-networking system 460.

In particular embodiments, the social-networking system 460 may provide users with the ability to take actions on various types of items or objects, supported by the social-networking system 460. As an example and not by way of limitation, the items and objects may include groups or social networks to which users of the social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 460 or by an external system of a third-party system 470, which is separate from the social-networking system 460 and coupled to the social-networking system 460 via a network 410.

In particular embodiments, the social-networking system 460 may be capable of linking a variety of entities. As an example and not by way of limitation, the social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating the social-networking system 460. In particular embodiments, however, the social-networking system 460 and third-party systems 470 may operate in conjunction with each other to provide social-networking services to users of the social-networking system 460 or third-party systems 470. In this sense, the social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 460 also includes user-generated content objects, which may enhance a user's interactions with the social-networking system 460. User-generated content may include anything a user can add, upload, send, or "post" to the social-networking system 460. As an example and not by way of limitation, a user communicates posts to the social-networking system 460 from a client system 430. Posts may include data such as status updates or other textual data, location information, photos, videos, links, music or other similar data or media. Content may also be added to the social-networking system 460 by a third-party through a "communication channel," such as a newsfeed or stream.

In particular embodiments, the social-networking system 460 may include a variety of servers, sub-systems, programs, modules, logs, and data stores. In particular embodiments, the social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 460 may also include suitable components such as network interfaces, security mechanisms, load balancers, failover servers, management-and-network-operations consoles, other suitable components, or any suitable combination thereof. In particular embodiments, the social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 460 to one or more client systems 430 or one or more third-party systems 470 via a network 410. The web server may include a mail server or other messaging functionality for receiving and routing messages between the social-networking system 460 and one or more client systems 430. An API-request server may allow a third-party system 470 to access information from the social-networking system 460 by calling one or more APIs. An action logger may be used to receive communications from a web server about a user's actions on or off the social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from a client system 430 responsive to a request received from a client system 430. Authorization servers may be used to enforce one or more privacy settings of the users of the social-networking system 460. A privacy setting of a user determines how particular information associated with a user can be shared. The authorization server may allow users to opt in to or opt out of having their actions logged by the social-networking system 460 or shared with other systems (e.g., a third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
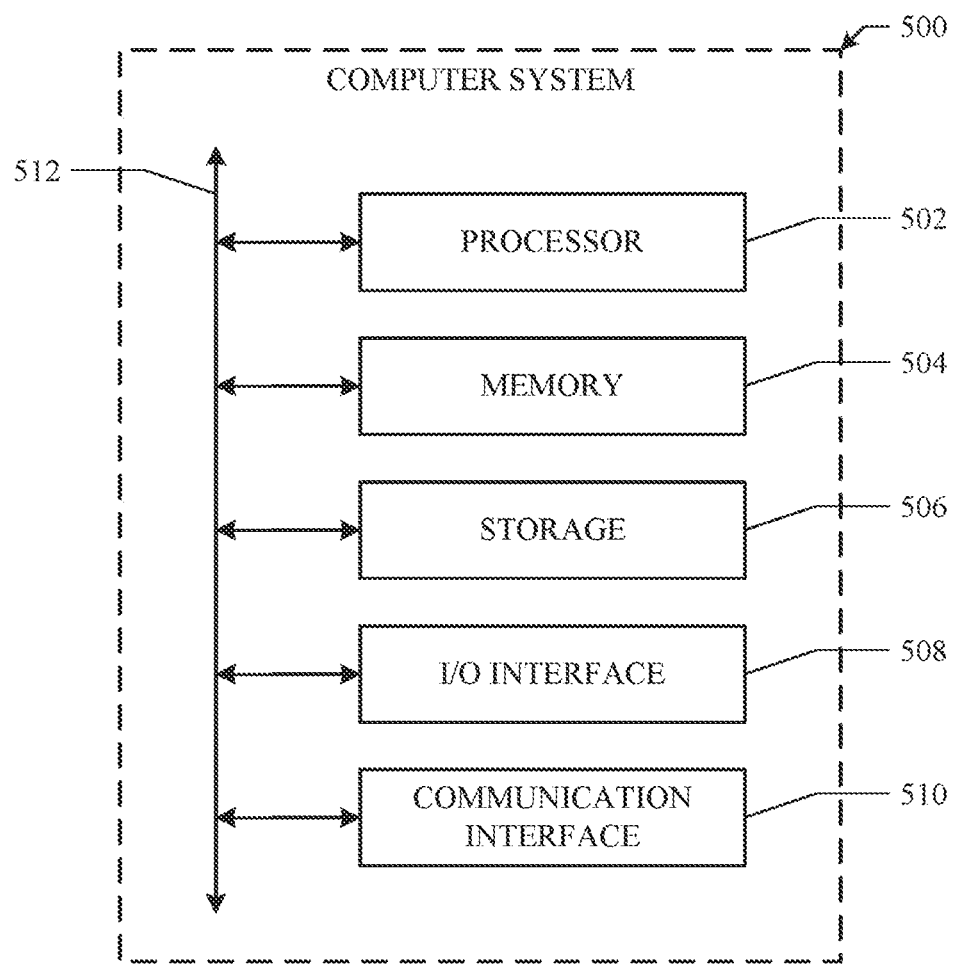
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first device:
    receiving, from a second device:
        a reference landmark map identifying locations of facial features of a user of the second device depicted in a reference image, and
        a feature map, generated based on the reference image, representing an identity of the user;
    receiving, from the second device, a current compressed landmark map based on a current image of the user;
    decompressing the current compressed landmark map to generate a current landmark map;
    updating the feature map based on a motion field generated using the reference landmark map and the current landmark map;
    generating scaling factors based on a normalization facial mask of pre-determined facial features of the user; and
    generating an output image of the user by decoding the updated feature map using the scaling factors.

2. The method of claim 1, further comprising:

receiving, from the second device, a subsequent compressed landmark map based on a subsequent image of the user;
decompressing the subsequent compressed landmark map to generate a subsequent landmark map;
updating the feature map based on the motion field generated using the reference landmark map and the subsequent landmark map; and
generating another output image of the user by decoding the updated feature map using the scaling factors.

3. The method of claim 1, further comprising:
using, by applying a dense motion machine-learning model, a downsampled reference image, the reference landmark map, and the current landmark map to generate the motion field and an occlusion map.

4. The method of claim 3, further comprising:
updating, using the feature map updated based on the motion field, the feature map based on the occlusion map, wherein the updated feature map is multiplied element-wise with the occlusion map to the updated feature map.

5. The method of claim 3, wherein the occlusion map indicates one or more portions of a face of a user that is occluded in the current frame.

6. The method of claim 1, wherein the reference landmark map indicates a plurality of reference locations of N landmarks for the reference image of the user, and wherein the current landmark map indicates a plurality of current locations of N landmarks for the current image of the user.

7. The method of claim 6, wherein the motion field indicates a change in location from the plurality of reference locations of N landmarks to the plurality of current locations of N landmarks.

8. The method of claim 1, wherein the normalization facial mask is generated based on a set of landmarks.

9. The method of claim 1, wherein decoding the updated feature map comprises:
applying a first set of scaling factors to the updated feature map to generate a first layer of the output image;
applying a second set of scaling factors to the first layer of the output image to generate a second layer of the output image; and
applying a subsequent set of scaling factors to the second layer of the output image to generate the output image.

10. One or more computer-readable non-transitory storage media embodying software that is operable when executed to:
receive, from a second device:
a reference landmark map identifying locations of facial features of a user of the second device depicted in a reference image, and
a feature map, generated based on the reference image, representing an identity of the user;
receive, from the second device, a current compressed landmark map based on a current image of the user;
decompress the current compressed landmark map to generate a current landmark map;
update the feature map based on a motion field generated using the reference landmark map and the current landmark map;
generate scaling factors based on a normalization facial mask of pre-determined facial features of the user; and
generate an output image of the user by decoding the updated feature map using the scaling factors.

11. The media of claim 10, wherein the software is further operable when executed to:
use, by applying a dense motion machine-learning model, a downsampled reference image, the reference landmark map, and the current landmark map to generate the motion field and an occlusion map.

12. The media of claim 11, wherein the software is further operable when executed to:
update, using the feature map updated based on the motion field, the feature map based on the occlusion map, wherein the updated feature map is multiplied element-wise with the occlusion map to the updated feature map.

13. The media of claim 11, wherein the occlusion map indicates one or more portions of a face of a user that is occluded in the current frame.

14. The media of claim 10, wherein the software is further operable when executed to:
apply a first set of scaling factors to the updated feature map to generate a first layer of the output image;
apply a second set of scaling factors to the first layer of the output image to generate a second layer of the output image; and
apply a subsequent set of scaling factors to the second layer of the output image to generate the output image.

15. A system comprising:
one or more processors; and
a non-transitory memory coupled to the processors comprising instructions executable by the processors, the processors operable when executing the instructions to:
receive, from a second device:
a reference landmark map identifying locations of facial features of a user of the second device depicted in a reference image, and
a feature map, generated based on the reference image, representing an identity of the user;
receive, from the second device, a current compressed landmark map based on a current image of the user;
decompress the current compressed landmark map to generate a current landmark map;
update the feature map based on a motion field generated using the reference landmark map and the current landmark map;
generate scaling factors based on a normalization facial mask of pre-determined facial features of the user; and
generate an output image of the user by decoding the updated feature map using the scaling factors.

16. The system of claim 15, wherein the processors are further operable when executing the instructions to:
use, by applying a dense motion machine-learning model, a downsampled reference image, the reference landmark map, and the current landmark map to generate the motion field and an occlusion map.

17. The system of claim 16, wherein the processors are further operable when executing the instructions to:
update, using the feature map updated based on the motion field, the feature map based on the occlusion map, wherein the updated feature map is multiplied element-wise with the occlusion map to the updated feature map.

18. The system of claim 16, wherein the occlusion map indicates one or more portions of a face of a user that is occluded in the current frame.

19. The system of claim 15, wherein the reference landmark map indicates a plurality of reference locations of N landmarks for the reference image of the user, and wherein the current landmark map indicates a plurality of current locations of N landmarks for the current image of the user.

20. The system of claim 15, wherein the processors are further operable when executing the instructions to:
- apply a first set of scaling factors to the updated feature map to generate a first layer of the output image;
- apply a second set of scaling factors to the first layer of the output image to generate a second layer of the output image; and
- apply a subsequent set of scaling factors to the second layer of the output image to generate the output image.

* * * * *